(12) United States Patent
Hardie et al.

(10) Patent No.: US 8,553,553 B1
(45) Date of Patent: Oct. 8, 2013

(54) QUALITY-OF-SERVICE MARKING NETWORK CONFIGURATIONS

(75) Inventors: Edward Thomas Lingham Hardie, Redwood City, CA (US); Michael Wiley, Bentonville, AR (US)

(73) Assignee: Google Inc., Mountain View, CA (US)

(*) Notice: Subject to any disclaimer, the term of this patent is extended or adjusted under 35 U.S.C. 154(b) by 36 days.

(21) Appl. No.: 13/410,123

(22) Filed: Mar. 1, 2012

(51) Int. Cl.
*G01R 31/08* (2006.01)

(52) U.S. Cl.
USPC ....... 370/235; 370/229; 370/465; 370/395.54

(58) Field of Classification Search
None
See application file for complete search history.

(56) References Cited

U.S. PATENT DOCUMENTS

| | | |
|---|---|---|
| 7,697,422 B1 | 4/2010 | Arad et al. |
| 7,774,498 B1 | 8/2010 | Kraemer et al. |
| 8,031,607 B2 * | 10/2011 | Rochon et al. ................ 370/235 |
| 8,077,608 B1 | 12/2011 | Arad et al. |
| 2005/0088977 A1 | 4/2005 | Roch et al. |
| 2010/0188974 A1 * | 7/2010 | Rochon et al. ................ 370/230 |

* cited by examiner

*Primary Examiner* — Ian N Moore
*Assistant Examiner* — Latresa A McCallum
(74) *Attorney, Agent, or Firm* — Foley & Lardner LLP; Edward A. Gordon

(57) ABSTRACT

System, method and program product, the system comprising: return network element along a return path for network flows for network sessions for a client; a controller computer; network elements along a forward path for the network flow for network sessions; with the return network element, configured to: receive packets for a return path network flow; determine whether there is an existing ruleset entry for quality-of-service marking packet data combination; sending the packet to the controller computer when the return network element deter mines no existing ruleset entry for the quality-of-service marking packet data combination. The return network element and/or controller computer configured to determine if the source network node is trusted. The controller computer configured to identify one or more network elements in a forward path, and initiate installation of a ruleset entry for the client along the forward path.

20 Claims, 5 Drawing Sheets

QUALITY-OF-SERVICE MARKING NETWORK CONFIGURATIONS

BACKGROUND OF THE INVENTION

Quality of Service markings establish various parameters such as drop rate probability and percentage bandwidth allocated to specific types of network flows. In some applications, these network flows have been identified by network elements applying quality of service markings on the basis of a source port or a destination IP and port. But the use of a broadly scoped proxy may reduce or eliminate an ability to differentiate network flow traffic which would have previously been given different markings, due to aggregation of flows onto an encrypted transport to a common destination IP and port. Thus, a problem arises in establishing Quality of Service markings for various network flows.

SUMMARY

Implementations of a system are disclosed, comprising: a return network element, a return network element along a return path for a network flow for one or more network sessions for a client; a controller computer; and one or more network elements along a forward path for the network flow for network sessions. In implementations, the return network element comprises one or more computers configured to: receive a packet along a return path for the network flow for a received network session from a source network node and detect a received packet quality-of-service marking; determine, using the one or more computers and using a return network element table or a return network element database of quality-of-service marking combinations, whether there is an existing ruleset entry for a quality-of-service marking packet data combination that comprises the received packet quality-of-service marking that was detected, source network node information and client information; not change the network element table or the network element database when the return network element determines that the return network element table or the return network element database has an existing ruleset entry for packets with the quality-of-service marking packet data combination; and send the packet to the controller computer when the return network element determines that the return network element table or the return network element database has no existing ruleset entry for the quality-of-service marking packet data combination that comprises the received packet quality-of-service marking that was detected, the source network node information and the client information. In implementations, at least one of the return network element and the controller computer is configured to determine if the source network node is trusted to associate quality-of-service markings with packets in network flows at least when the return network element determines that the return network element table or the return network element database has no existing ruleset entry for the quality-of-service marking packet data combination. In implementations, the controller computer is configured to identify one or more forward network elements in a forward path network flow for packets with the quality-of-service marking packet data combination when the return network element determines that the return network element table or the return network element database has no existing ruleset entry for the quality-of-service marking packet data combination; and to initiate installation, using one or more network communications, if the source network node is trusted to associate quality-of-service markings with network flows, of a ruleset entry for the client in one or more forward network databases or forward network tables associated with one or more of the network elements along the forward path for the network flow and also in the return network element database or the return network element table, so that forward packets with the client information carry the same quality-of-service marking as the quality-of-service marking packet data combination, until the ruleset entry is aged out.

Implementations of a method are disclosed comprising: receiving, using one or more return computers, a packet along a return path for a network flow for a received network session from a source network node and detecting a received packet quality-of-service marking; determining, using the one or more return computers and using a return network element table or a return network element database of quality-of-service marking combinations, whether there is an existing ruleset entry for a quality-of-service marking packet data combination that comprises the received packet quality-of-service marking that was detected, source network node information and client information; not changing the network element table or the network element database when it is determined that the return network element table or the return network element database has an existing ruleset entry for packets with the quality-of-service marking packet data combination; and sending the packet to a controller computer when the return network element determines that the return network element table or the return network element database has no existing ruleset entry for the quality-of-service marking packet data combination that comprises the received packet quality-of-service marking that was detected, the source network node information and the client information. In implementations, the method further comprises determining, using the one or more return element computers and/or the controller computer, if the source network node is trusted to associate quality-of-service markings with packets in network flows when the return network element determines that the return network element table or the return network element database has no existing ruleset entry for the quality-of-service marking packet data combination. In implementations, the method further comprises identifying one or more forward network elements in a forward path network flow for packets with the quality-of-service marking packet data combination when it is determined that the return network element table or the return network element database has no existing ruleset entry for the quality-of-service marking packet data combination; and initiating installation, using one or more network communications, if the source network node is trusted to associate quality-of-service markings with network flows, of a ruleset entry for the client in one or more forward network databases or forward network tables associated with one or more of the network elements along the forward path for the network flow and also in the return network element database or the return network element table, so that forward packets with the client information carry the same quality-of-service marking as the quality-of-service marking packet data combination, until the ruleset entry is aged out.

BRIEF DESCRIPTION OF THE DRAWINGS

The above and related objects, features and advantages of the present disclosure will be more fully understood by reference to the following detailed description, when taken in conjunction with the following figures, wherein.

DETAILED DESCRIPTION

Implementations described generally relate to a system, method and program product for quality of service marking management.

Figure 1A:
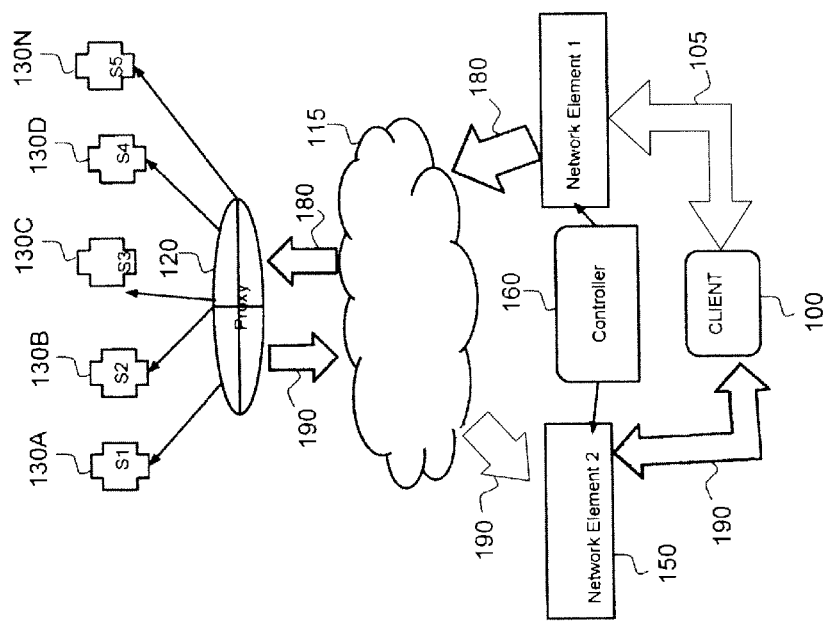
FIG. 1A is a schematic block diagram of an implementation of a system configuration consistent with the invention when an unmarked network flow is propagated.

Referring to FIG. 1A, an implementation of a system configuration is disclosed when an unmarked network flow is propagated in a forward flow. Represented in FIG. 1A is a client computer 100, which sends over a network 105 an application-specific request or command for a service. The application-specific request or command is received by a network element 110 along a forward path for network sessions, which network element may be implemented to include one or more computers. The application-specific request or command is then sent, via one or more electronic networks 115, to a proxy server 120 which provides access to multiple services 130, 132, 134, 136, 138, n. The proxy server 120, in implementations may be comprised of a first one or more computers. The proxy server 120 sends the application-specific request or command to one of the services 130A, 130B, 130C, 130D, 130N. Each of these services is associated with a different quality of service marking, e.g., in implementations, a specific field in the IP header.

A return path network flow 140 associated with this request or command is illustrated as received by the proxy server 120, and sent via one or more electronic networks 115, to a return network element 150 along a return path, which forwards the return path network flow to the client 100. A controller computer 160 is also illustrated, with its configuration to be discussed below.

In implementations, the proxy server 120 may be configured as follows. As noted above, the proxy server 120 may be configured to receive over the network 115 the application-specific request or command 110 from the client 100 for access to one of the multiple services 130-138 for a first network session.

In implementations, the proxy server 120 may be configured to determine, using the first one or more computers, a quality-of-service class to mark packets for the first network session with a quality of service marking. In implementations, this quality-of-service class may be determined based at least in part on semantic content of the request or command. In implementations, the quality of service marking may be used to indicate to one or more network elements which router queue for a set of routers to place the network flow, e.g., expedited forwarding (voice), assured forwarding, jitter-free, etc., based at least in part on the semantic content of the request.

In implementations, the proxy server 120 may be further configured to detect, using the first one or more computers, a packet in a return path network flow for the first network session for this request or command. In some implementations, this first network session may be identified by at least an IP address/IP port for the client and an identification of the particular service from the set of services 130A-130N.

In implementations, the proxy server 120 may be further configured to apply, using the first one or more computers, the determined quality of service marking to the packets in the return path network flow for the first network session.

In implementations, the return network element 150 comprises a second one or more computers, configured to receive the packets in a return path network flow for network sessions for a client from a source network node and detect a quality-of-service marking.

In implementations, the return network element 150, may be a switch or a router, and may be configured to determine, using the second one or more computers and using a return network element table or a return network element database of quality-of-service marking combinations (tuples), whether there is an existing ruleset entry for a quality-of-service marking packet data combination that comprises the received packet quality-of-service marking that was detected, information on the source network node, and client information.

In implementations, the return network element 150, may be further configured to not change the network element table or the network element database when the return network element determines that the return network element table or the return network element database has an existing ruleset entry for packets with the quality-of-service marking packet data combination, e.g., from the source network node, with the quality-of-service marking in the packet being the same (has not changed), for the same client. In implementations, in this situation the packet may be simply forwarded on to the client.

In implementations, the return network element 150, may be further configured to send the packet to the controller computer 160 when the return network element 150 has determined that the return network element table or the return network element database has no existing ruleset entry for the quality-of-service marking packet data combination that comprises the received packet quality-of-service marking that was detected, the source network node information, and the client information.

In implementations, at least one of the return network element 150 and the controller computer 160 may be configured to determine if the source network node is trusted to associate quality-of-service markings with packets in network flows. In implementations, this determination may be made by accessing a trust table or a trust database accessible by one or both of the return network element 150 and the controller computer 160. The trust table or trust database may list one or more source nodes, e.g., proxy servers, that are trusted to associate quality of server markings. For example, the trust table or trust database may list source IP addresses for trusted source nodes, e.g., IPv4 or IPv6, in the packets on the return path. The identified IP address may in implementations become a destination IP address on a forward path, as the flow "reverses."

In implementations, the controller computer 160 may be configured to identify one or more network elements in a forward path for network sessions for packets with the quality-of-service marking packet data combination when the return network element 150 determines that the return network element table or the return network element database has no existing ruleset entry for the quality-of-service marking packet data combination, e.g., determining which other network elements are on path for the outbound network flow and need to be updated with a ruleset entry. In implementations, the ruleset entry state is not synchronized across all potential devices and/or the information about which network device is on-path is not shared across all devices, e.g., for example, to avoid creating a very large state maintenance problem (particularly when there are many flows and many egress/ingress points), and/or to avoid creating a severe limitation on where return packets can be detected and outbound packets for that flow marked. Accordingly, in implementations, the controller computer may be configured to not initiate installation of the ruleset entry across all potential devices and/or the information about which network device is on-path is not shared across all devices. In implementations, the controller computer may be configured to selectively initiate installation of the ruleset entry only to devices on-path for the network flow.

In implementations, the controller computer 160 may be configured to initiate installation, using one or more network communications, if the source network node is trusted to associate quality-of-service markings with network flows, of a ruleset entry for the client in one or more forward network databases or forward network tables associated with one or more of the network elements along the forward path for the network flow and also in the return network element database or the return network element table, so that forward packets with the same client information carry the same quality-of-service marking as the quality-of-service marking packet data combination, until the ruleset entry is aged out. Thus, in implementations installation of this ruleset entry occurs for network flows for this client so long as the quality of service marking remains the same (e.g., the client has not made a request for a different service) and the network flow has not timed out.

Figure 1B:
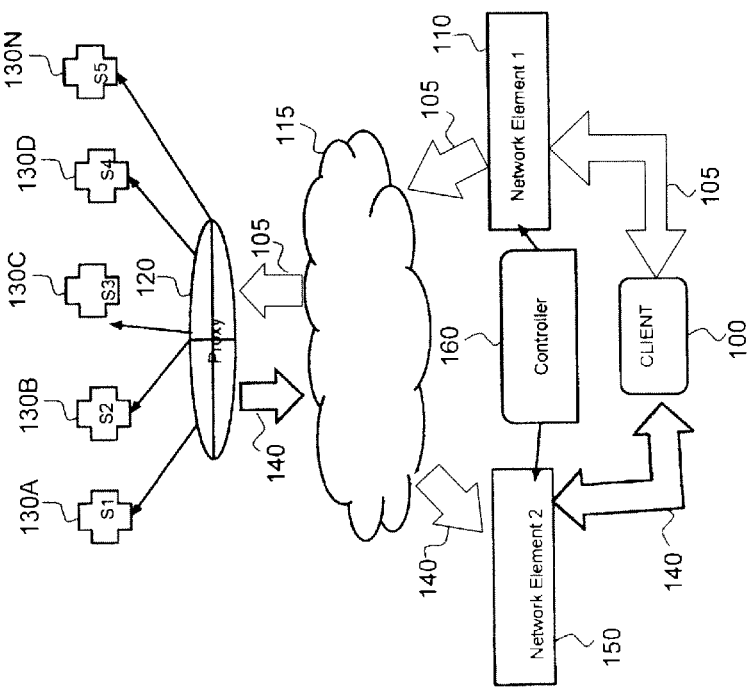
FIG. 1B is a schematic block diagram of the system configuration of FIG. 1 after operation of system.

Referring to FIG. 1B, the configuration of FIG. 1A is shown after operation to add a ruleset entry into network elements in the forward path for the network flow. The packets coming from the network element 1 are now marked, and represented by the flow 180. Likewise, the packets in the return flow for this client are marked and are represented by flow 190.

In implementations, the source network node is a proxy server.

In implementations, the client information comprises data on an IP address for the client.

In implementations, the return network element is configured to determine if the source network node is trusted to associate quality-of-service markings with network flows.

In implementations, the controller computer is configured to determine if the source network node is trusted to associate quality-of-service markings with network flows.

In implementations, the return network element 150 is an OpenFlow-enabled switch or router, and wherein the return network element table comprises a plurality of OpenFlow rulesets or the return network element database comprises a plurality of OpenFlow rulesets, and wherein the controller computer 160 is an OpenFlow controller, and is configured so that if it is determined that the source network node is trusted to associate quality-of-service markings with network flows, then the controller computer 160 initiates installation of a new OpenFlow ruleset entry for the client in one or more forward network databases or forward network tables associated with one or more of the network elements along the forward path for the network flow with that client information and also in the return network element database or the return network element table.

Thus, in implementations, return path traffic is seen by an OpenFlow-enabled switch or router 150. When QoS-marked return traffic is seen by this device 150, it checks its local OpenFlow ruleset; if it does not see a forward path marking ruleset, it forwards a copy of the return path traffic to an OpenFlow Controller 160. If the OpenFlow controller 160 or the device 150 trusts the source of the QoS marking, it installs or initiates installation of an OpenFlow rule to add the corresponding marking to the outbound flow to network elements which will be on-path for the outbound flow. Note that these may not be the same as the network element which triggered the examination, because of asymmetric routing. In the case where it is not, the controller will also need to add a rule to the network element which is on-path for the return flows, in order to indicate that the future packets in that flow do not need to be copied to the OpenFlow controller 160 unless the return marking changes or the flow times out. If it does change, the same process occurs again; thereby allowing the QoS marking to be updated when the application using the proxy changes.

In implementations, stale OpenFlow rules may be removed so that they do not overwhelm the OpenFlow tables. In implementations, the OpenFlow controller 160 or the device 150 may be configured to determine stale rules based on a time dimension, e.g., timing out after a period of time, and/or based on another one or more parameters.

Implementations hereof may be advantageous where proxies allow multiplexing of different application traffic onto a single transport, so that inference of quality of service markings may not work because the network element inspecting the traffic is not inherently aware of the application boundaries within the flow.

Implementations hereof may be advantageous in networks with a proxy in-path to their respective cloud service provider. Implementations may be used as part of a service offered to enterprise customers of cloud service offerings.

Implementations hereof may be advantageously used where one or more proxy servers and/or edge devices in enterprise networks are used, in order to better prioritize flows destined for the proxies. Thus, network flows from inappropriate or non-designated services may have their quality of service markings downgraded. In implementations, the proxy server 120 and/or a return network element 150 may access of a table or database of disapproved services and/or network flows and designated quality of service markings for those respective disapproved services and/or network flows. Alternatively or in addition, the quality of service marking for network flows for approved services may be upgraded to a designated one or more higher priorities, e.g., the proxy server 120 and/or a return network element 150 may access a table or database of approved services and/or network flows and designated quality of service markings for those respective services and/or network flows.

Implementations hereof may be used for encrypted flows because it relies on marking at one end of the flow, e.g., the proxy server is a termination point.

In implementations, return traffic is examined by a return network element which, when it trusts the proxy server, causes all successor outbound traffic for that flow to be marked with the same QoS marking as was present on the return flow. In a specific implementation, return path traffic from a proxy server is seen by an OpenFlow-enabled switch or router. When QoS-marked return traffic is seen by this device, it checks its local OpenFlow ruleset; if it does not see a forward path marking ruleset, it forwards a copy of the traffic to the OpenFlow Controller. If the OpenFlow controller trusts the source of the QoS marking, it installs an OpenFlow rule to add the corresponding marking to the outbound flow to network elements which will be on-path for the outbound.

Figure 2A:
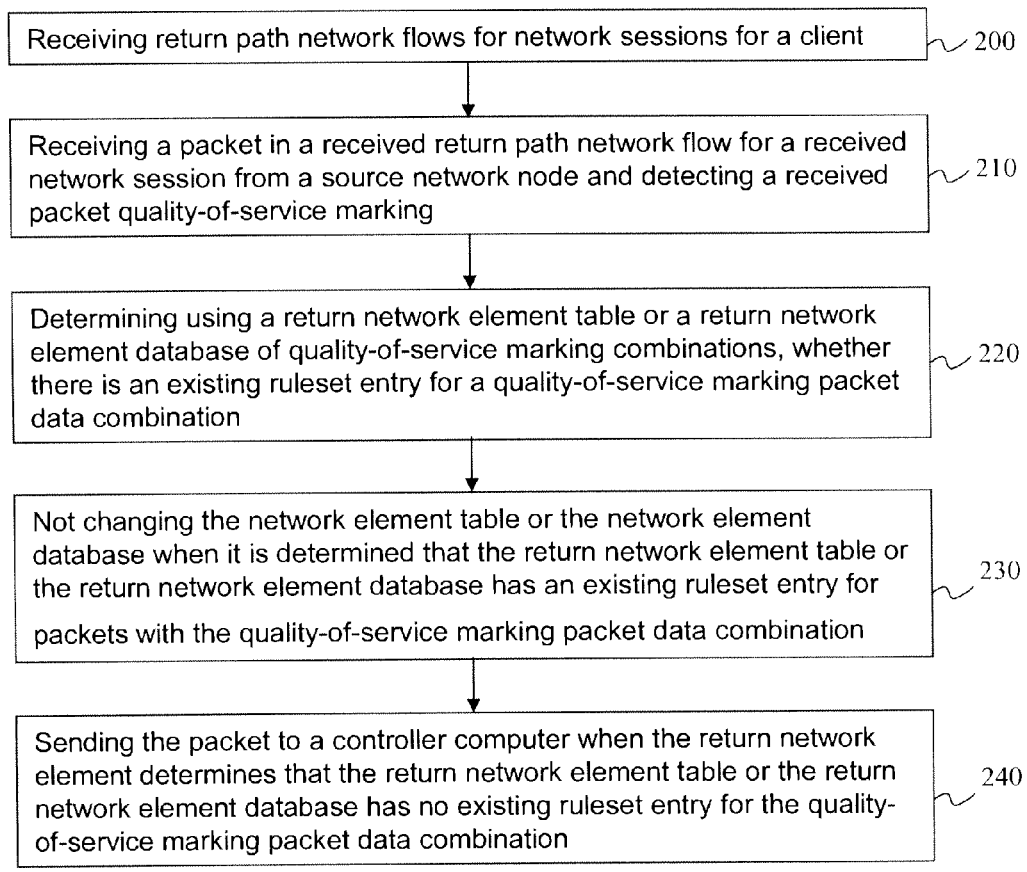
FIGS. 2A and 2B comprise a flowchart of a first implementation of a consistent with the invention.
Figure 2B:
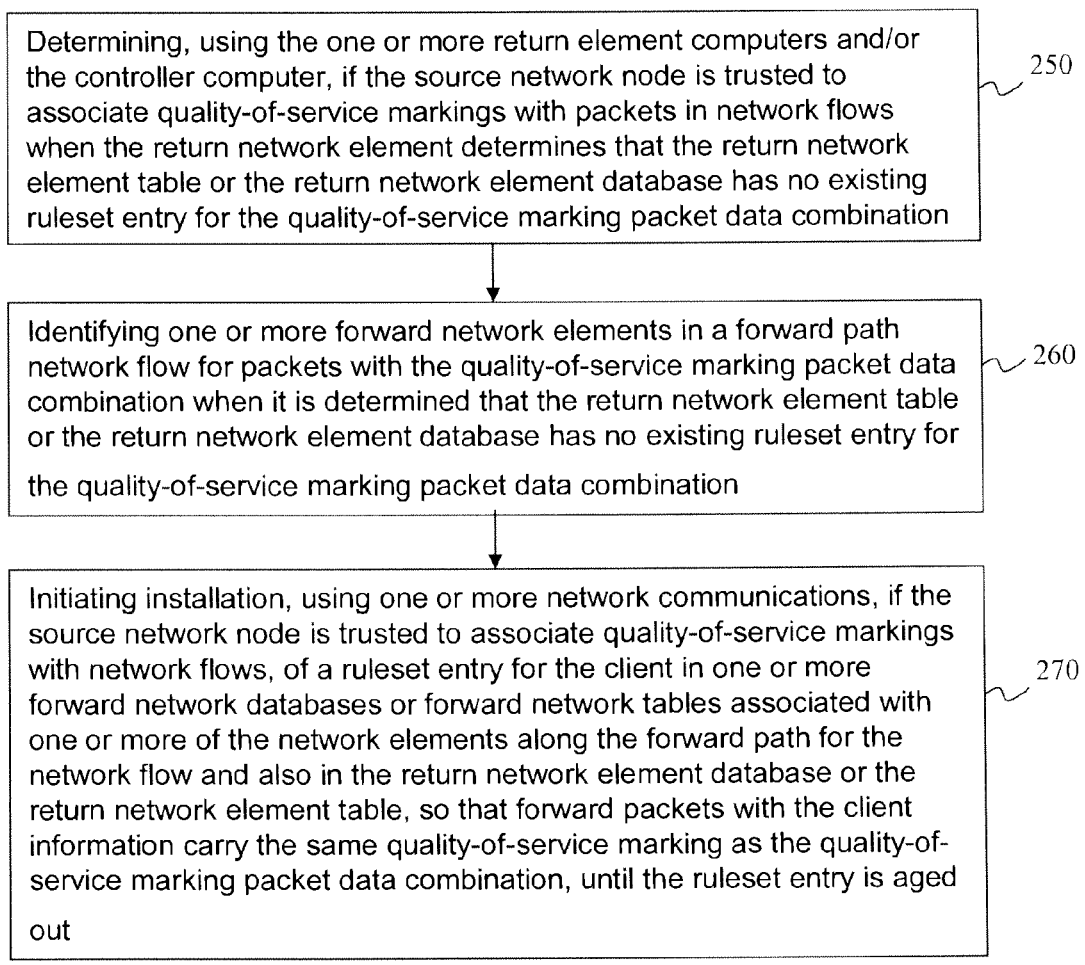

Referring to FIG. 2, implementations of a method are disclosed. Block 200 represents an operation of receiving return path network flows for network sessions for a client, using one or more return computers.

In implementations, block 210 represents an operation of receiving, using the one or more return computers, a packet along a return path for a network flow for a received network session from a source network node and detecting a received packet quality-of-service marking.

In implementations, block 220 represents an operation of determining, using the one or more return computers and using a return network element table or a return network element database of quality-of-service marking combinations, whether there is an existing ruleset entry for a quality-of-service marking packet data combination/tuple that comprises the received packet quality-of-service marking that was detected, source network node information and client information. Note that other information may also be included in the combination/tuple.

In implementations, block 230 represents an operation of not changing the network element table or the network element database when it is determined that the return network element table or the return network element database has an existing ruleset entry for packets with the quality-of-service marking packet data combination; sending the packet to a controller computer when the return network element determines that the return network element table or the return network element database has no existing ruleset entry for the quality-of-service marking packet data combination that comprises the received packet quality-of-service marking that was detected and the source network node.

In implementations, block 240 represents an operation of sending the packet to a controller computer when the return network element determines that the return network element table or the return network element database has no existing ruleset entry for the quality-of-service marking packet data combination that comprises the received packet quality-of-service marking that was detected, the source network node information and the client information.

In implementations, block 250 represents an operation of determining, using the one or more return element computers and/or the controller computer, if the source network node is trusted to associate quality-of-service markings with packets in network flows when the return network element determines that the return network element table or the return network element database has no existing ruleset entry for the quality-of-service marking packet data combination.

In implementations, block 260 represents an operation of identifying one or more forward network elements in a forward path network flow for packets for the client when it is determined that the return network element table or the return network element database has no existing ruleset entry for the quality-of-service marking packet data combination.

In implementations, block 270 represents an operation of initiating installation, using one or more network communications, if the source network node is trusted to associate quality-of-service markings with network flows, of a ruleset entry for the client in one or more forward network databases or forward network tables associated with one or more of the network elements along the forward path for the network flow and also in the return network element database or the return network element table, so that forward packets with the client information carry the same quality-of-service marking as the quality-of-service marking packet data combination, until the ruleset entry is aged out.

Figure 3:
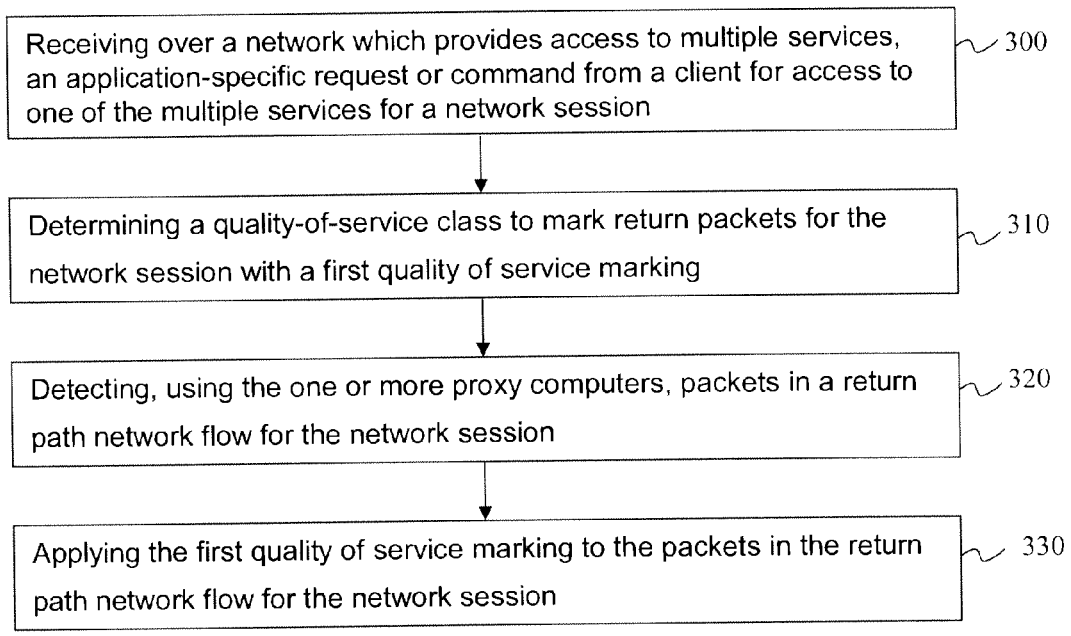
FIG. 3 is a flowchart of a second implementation of a method consistent with the invention.

Referring to FIG. 3, implementations of a proxy server method are disclosed. Block 300 represents an operation of receiving over a network which provides access to multiple services, an application-specific request or command from a client for access to one of the multiple services for a network session.

In implementations, block 310 represents an operation of determining, using the one or more proxy computers, a quality-of-service class to mark return packets for the network session with a first quality of service marking.

In implementations, block 320 represents an operation of detecting, using the one or more proxy computers, packets along the return path for the network flow for the network session.

In implementations, block 330 represents an operation of applying, using the one or more proxy computers, the first quality of service marking to the packets along the return path for the network flow for the network session.

Figure 4:
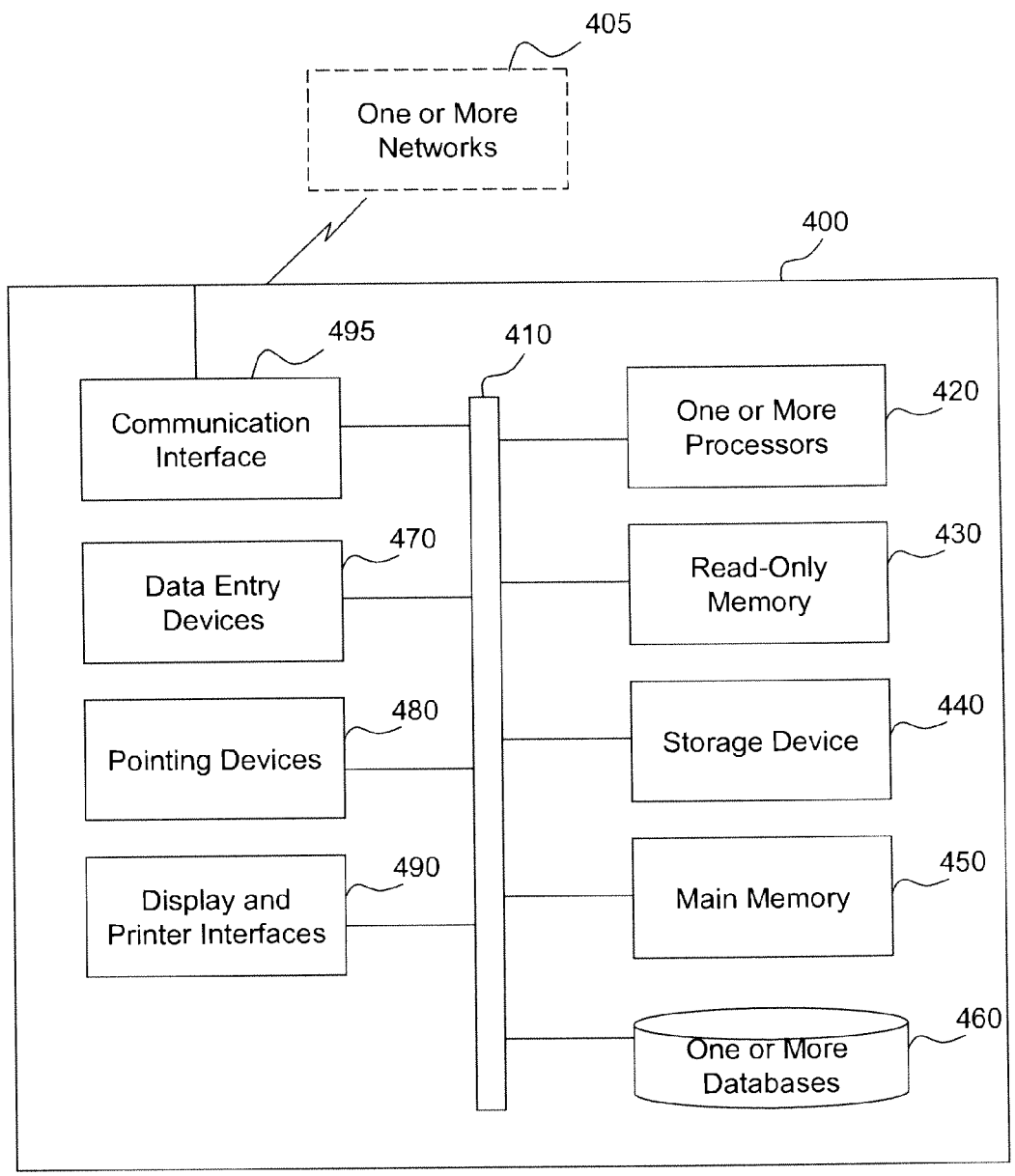
FIG. 4 is a schematic diagram of a computer configuration that may be used to implement implementations.

FIG. 4 is a block diagram showing an implementation of a computer system that may be used for implementations of various network and controller elements, generally designated by reference number 400 in FIG. 4. In one implementation, the system 400 may be communicatively coupled to one or more networks 405 via a communication interface 495. The one or more networks 405 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 495 may be implemented accordingly. The network 405 serves the purpose of delivering information between connected parties.

In implementations, the Internet may comprise the network 405. The system 400 may also or alternatively be communicatively coupled to a network 405 comprising a closed network (e.g., an intranet). The system 400 may be configured to communicate, via the one or more networks 405, with respective computer systems of multiple entities.

The system 400 may comprise, in implementations, a computing platform for performing, controlling, and/or initiating computer-implemented operations, for example, via a server and the one or more networks 405. The computer platform may comprise system computers and other party computers. The system 400 may operate under the control of computer-executable instructions to carry out the process steps described herein. Computer-executable instructions comprise, for example, instructions and data which cause a general or special purpose computer system or processing device to perform a certain function or group of functions. Computer software for the system 400 may comprise, in implementations, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The system 400 may comprise, one or more personal computers, workstations, notebook computers, servers, mobile computing devices, handheld devices, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

The system 400 may comprise, in implementations, a bus 410 or other communication component that couples the various system elements 420-495, and is configured to communicate information between the various system elements 420-495.

As shown in FIG. 4, one or more computer processors 420 may be coupled with the bus 410 and configured to process and handle information and execute instructions. The system 400 may include a main memory 450, such as a Random Access Memory (RAM) or other dynamic storage device, coupled to the bus 400, for storing information and instructions to be executed by the one or more processors 420. The main memory 450 also may be used for storing temporary variables or other intermediate information during execution of instructions by the one or more processors 420.

The system 400 further may include a Read-Only Memory (ROM) 430 or other static storage device (e.g., EPROM, EAROM, EEPROM, PROM, flash, and the like) coupled to the bus 410 for storing static information and instructions for the one or more processors 420. Furthermore, a storage device 440, such as a magnetic disk or optical disk, such as a CD-ROM or other optical media may be provided and coupled to the bus 410 for storing information and instructions.

In addition to the ROM 430, one or more databases 460 may be coupled to the bus 410 for storing static information and software instructions. Information stored in or maintained in the database 460 may be provided in conformance with a database system format such as, but not limited to, the Structured Query Language (SQL) format. Database query and access instructions, for example, in the form of one or more scripts, may be used which, when executed by a processor such as the processor 420, serve to access, store and retrieve data maintained in the database 460 according to the instructions contained in the script.

Furthermore, the system 400 may comprise application software instructions which may implement a user interface portion for generating interactive pages or display screens by which a user may provide data to and receive information from the system 400 and the database 460 using a human-machine interface. Interactive pages may include user dialog boxes for accepting user entered information. In particular, the human-machine interface may comprise a Graphical User Interface (GUI) portion for prompting the user to enter data by providing an interactive dialog box or message box instructing the user to enter particular data, or to select from among a multitude of options provided using a pull-down menu. A user may interact with the system 400 via the graphical user interface by using a pointing device and/or data entry device. The GUI portion may place the output of the system 400 in a format for presentation to a user via the display. In at least one implementation, the GUI may be implemented as a sequence of Java instructions.

A data entry device 470, including alphanumeric and other keys, or a pointing device such as a mouse or trackball, or a scanner, to name a few, may be coupled to the bus 410 for communicating information and command selections to the processor 420. The data entry device 470 may be coupled to the bus 410 via an interface (not shown), wherein the interface may be, for example, a serial port, an RS-232 port, or the like. In addition, the interface may be a wireless interface and provide connection-less communication via, for example, Bluetooth communication.

The system 400 may be coupled via the bus 410 to a display or printer 490 for outputting information to a computer user. In addition, a user may use the display (e.g., touch screen) or printer (e.g., scanner) to provide information to the system 400.

In implementations, the various program operations as described herein may be provided by the system 400 in response to the one or more processors 420 executing one or more sequences of computer-readable instructions contained in the main memory 450. Such instructions may be read into the main memory 450 from another computer-readable medium, such as the ROM 430, the storage device 440, or the database 460. Execution of the sequences of instructions contained in the main memory 450 may cause the one or more processors 420 to perform the process steps described herein. It should be appreciated implementations of the system 400 may perform fewer or additional processes as compared to those described herein. As noted, the one or more processors 420 may be arranged in a multi-processing arrangement. Alternatively, hard-wired circuitry may be used in place of or in combination with software instructions to implement the invention. Thus, implementations of the invention are not limited to any specific combination of hardware circuitry and software.

As previously noted, the system 400 also comprises a communication interface 495 coupled to the bus 410 for providing one-way, two-way or multi-way data communication with the network 405, or directly with other devices. In implementations, the communication interface 495 may comprise a modem, a transceiver Integrated Services Digital Network (ISDN) card, a WAN card, an Ethernet interface, or the like, to provide a data communication connection to a corresponding type of communication medium. As another example, the communication interface 495 may comprise a LAN card to provide a data communication connection to a compatible LAN. Wireless links may also be implemented. In such wireless links, communication interface 495 may communicate with a base station communicatively coupled to a network server. In any such implementation, the communication interface 495 sends and receives electrical, electromagnetic, radio, infrared, laser, or optical signals that carry digital data streams representing various types of information. Any combination of the above interfaces may also be implemented.

In implementations, the communication interface 495 may be communicatively coupled to a web server configured to generate and output web content that is suitable for display using a web browser at a computing device. In implementations, the server may generate and transmit requested information through the communication interface 495 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from the clients' terminals, access and process data from various sources, and output computer-executable instructions and data using the network 405.

The web server, in implementations, may correspond to a secure web application server operating behind a web server program that a service provider employs to run one or more web based application programs to carry out the methods described above in a secure fashion. Such a secure web application server may be configured to execute one or more web based application programs, respond to commands and data received from the clients (via a web page supported by the web server), and provide data and results to the clients. The web server and the web application server may be implemented using a single computing platform. Alternatively, it may be implemented using multiple separate and distributed computing platforms.

Implementations include program products comprising machine-readable media with machine-executable instructions or data structures stored thereon. Such machine-readable media may be any available storage media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other storage medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Implementations of the invention have been described in the general context of method steps which may be implemented in implementations by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Implementations of the present invention may be practiced with one or multiple computers in a networked environment using logical connections to one or more remote computers (including mobile devices) having processors. Logical connections may include the previously noted local area network (LAN) and a wide area network (WAN) that are presented here by way of example and not limitation. Implementations of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the."

All components, modes of communication, and/or processes described heretofore are interchangeable and combinable with similar components, modes of communication, and/ or processes disclosed elsewhere in the specification, unless an express indication is made to the contrary. It is intended that any structure or step of an implementation disclosed herein may be combined with other structure and or method implementations to fowl an implementation with this added element or step.

While this invention has been described in conjunction with the exemplary implementations outlined above, it is evident that many alternatives, modifications and variations will be apparent to those skilled in the art. Accordingly, the exemplary implementations of the invention, as set forth above, are intended to be illustrative, not limiting. Various changes may be made without departing from the spirit and scope of the invention.

The invention claimed is:

1. A system, comprising:
   a return network element along a return path for a network flow for one or more network sessions for a client;
   a controller computer; and
   one or more network elements along a forward path for the network flow for network sessions;
   wherein the return network element comprises one or more computers, configured to:
      receive a packet along a return path for the network flow for a received network session from a source network node and detect a received packet quality-of-service marking;
      determine, using the one or more computers and using a return network element table or a return network element database of quality-of-service marking combinations, whether there is an existing ruleset entry for a quality-of-service marking packet data combination that comprises the received packet quality-of-service marking that was detected, source network node information and client information;
      not change the network element table or the network element database when the return network element determines that the return network element table or the return network element database has an existing ruleset entry for packets with the quality-of-service marking packet data combination;
      send the packet to the controller computer when the return network element determines that the return network element table or the return network element database has no existing ruleset entry for the quality-of-service marking packet data combination that comprises the received packet quality-of-service marking that was detected, the source network node information and the client information;
   wherein at least one of the return network element and the controller computer are configured to determine if the source network node is trusted to associate quality-of-service markings with packets in network flows at least when the return network element determines that the return network element table or the return network element database has no existing ruleset entry for the quality-of-service marking packet data combination;
   wherein the controller computer is configured to identify one or more forward network elements in a forward path network flow for packets with the quality-of-service marking packet data combination when the return network element determines that the return network element table or the return network element database has no existing ruleset entry for the quality-of-service marking packet data combination; and
   the controller computer is configured to initiate installation, using one or more network communications, if the source network node is trusted to associate quality-of-service markings with network flows, of a ruleset entry for the client in one or more forward network databases or forward network tables associated with one or more of the network elements along the forward path for the network flow and also in the return network element database or the return network element table, so that forward packets with the client information carry the same quality-of-service marking as the quality-of-service marking packet data combination, until the ruleset entry is aged out.

2. The system as defined in claim 1, wherein the source network node is a proxy server.

3. The system as defined in claim 1, wherein the client information comprises an IP address for the client.

4. The system as defined in claim 1, wherein the return network element is configured to determine if the source network node is trusted to associate quality-of-service markings with network flows.

5. The system as defined in claim 1, wherein the controller computer is configured to determine if the source network node is trusted to associate quality-of-service markings with network flows.

6. The system as defined in claim 1, wherein the return network element is an OpenFlow-enabled switch or router, and wherein the return network element table comprises a plurality of OpenFlow rulesets or the return network element database comprises a plurality of OpenFlow rulesets, and wherein the controller computer is an OpenFlow controller, and is configured so that if it is determined that the source network node is trusted to associate quality-of-service markings with network flows, then the controller computer initiates installation of a new OpenFlow ruleset entry for the client in one or more forward network databases or forward network tables associated with one or more of the network elements along the forward path for the network flow with that client information and also in the return network element database or the return network element table.

7. The system as defined in claim 1, wherein the source network node is a proxy server, wherein the proxy server comprises one or more proxy computers, configured to:
   receive over a network which provides access to multiple services, an application-specific request or command from a client for access to one of the multiple services for a network session;
   determine, using the one or more proxy computers, a quality-of-service class to mark return packets for the network session with a first quality of service marking;
   detect, using the one or more proxy computers, packets along the return path for the network flow for the network session; and
   apply, using the one or more proxy computers, the first quality of service marking to packets along the return path for the network flow for the network session.

8. The system as defined in claim 7, wherein the return network element and/or the controller computer are configured to determine that the proxy server is trusted to associate quality-of-service markings with packets in network flows.

9. The system as defined in claim 7, wherein the proxy server and/or the return network element is configured to:
   access a table or database of at least one of disapproved services and/or disapproved network flows and designated quality of service markings for those respective disapproved services and/or disapproved network flows, approved services and/or approved network flows and designated quality of service markings for those respective approved services and/or approved network flows; and
   change a detected quality of service marking based at least in part on the table or database of disapproved services and/or disapproved network flows and/or the table or database of approved services and/or approved network flows.

10. The system as defined in claim 1, wherein the controller computer is configured to selectively initiate installation of the ruleset entry only to devices on-path for the network flow.

11. A method comprising:
   receiving, using one or more return computers, a packet along a return path for a network flow for a received network session from a source network node and detecting a received packet quality-of-service marking;
   determining, using the one or more return computers and using a return network element table or a return network element database of quality-of-service marking combinations, whether there is an existing ruleset entry for a quality-of-service marking packet data combination that comprises the received packet quality-of-service marking that was detected, source network node information and client information;
   not changing the network element table or the network element database when it is determined that the return network element table or the return network element database has an existing ruleset entry for packets with the quality-of-service marking packet data combination;
   sending the packet to a controller computer when the return network element determines that the return network element table or the return network element database has no existing ruleset entry for the quality-of-service marking packet data combination that comprises the received packet quality-of-service marking that was detected, the source network node information and the client information;
   determining, using the one or more return element computers and/or the controller computer, if the source network node is trusted to associate quality-of-service markings with packets in network flows when the return network element determines that the return network element table or the return network element database has no existing ruleset entry for the quality-of-service marking packet data combination;
   identifying one or more forward network elements in a forward path network flow for packets with the quality-of-service marking packet data combination when it is determined that the return network element table or the return network element database has no existing ruleset entry for the quality-of-service marking packet data combination; and
   initiating installation, using one or more network communications, if the source network node is trusted to associate quality-of-service markings with network flows, of a ruleset entry for the client in one or more forward network databases or forward network tables associated with one or more of the network elements along the forward path for the network flow and also in the return network element database or the return network element table, so that forward packets with the client information carry the same quality-of-service marking as the quality-of-service marking packet data combination, until the ruleset entry is aged out.

12. The method as defined in claim 11, wherein the source network node is a proxy server.

13. The method as defined in claim 11, wherein the client information comprises an IP address for the client.

14. The method as defined in claim 11, wherein the determining if the source network node is trusted to associate quality-of-service markings with packets in network flows is performed by the return network element.

15. The method as defined in claim 11, wherein the determining if the source network node is trusted to associate quality-of-service markings with packets in network flows is performed by the controller computer.

16. The method as defined in claim 11, wherein the return network element is an OpenFlow-enabled switch or router, and wherein the return network element table comprises a plurality of OpenFlow rulesets or the return network element database comprises a plurality of OpenFlow rulesets, and wherein the controller computer is an OpenFlow controller, and
 wherein the controller computer performs the step of, if it is determined that the source network node is trusted to associate quality-of-service markings with network flows, then the initiating installation comprises initiating installation of a new OpenFlow ruleset entry for the client in one or more forward network databases or forward network tables associated with one or more of the network elements along the forward path for the network flow with that client information and also in the return network element database or the return network element table.

17. The method as defined in claim 11, wherein the source network node is a proxy server, wherein the proxy server comprises one or more proxy computers that perform the steps:
 receiving over a network which provides access to multiple services, an application-specific request or command from the client for access to one of the multiple services for a network session;
 determining, using the one or more proxy computers, a quality-of-service class to mark return packets for the network session with a first quality of service marking;
 detecting, using the one or more proxy computers, packets along the return path for the network flow for the network session; and
 applying, using the one or more proxy computers, the first quality of service marking to the packets along the return path for the network flow for the network session.

18. The method as defined in claim 17, further comprising determining that the proxy server is trusted to associate quality-of-service markings with packets in network flows.

19. The method as defined in claim 17, further comprising:
 accessing a table or database of disapproved services and/or disapproved network flows and designated quality of service markings for those respective disapproved services and/or disapproved network flows and/or a table or database of approved services and/or approved network flows and designated quality of service markings for those respective approved services and/or approved network flows; and
 changing a detected quality of service marking based at least in part on the table or database of disapproved services and/or disapproved network flows and/or the table or database of approved services and/or approved network flows.

20. The method as defined in claim 11, wherein the step of initiating installation of the ruleset entry is not initiated across all potential devices and/or the information about which network device is on-path is not shared across all devices.

* * * * *